United States Patent
Farjadrad et al.

(10) Patent No.: US 10,069,521 B1
(45) Date of Patent: Sep. 4, 2018

(54) INTELLIGENT POWER BALANCING FOR NBASE-T ETHERNET

(71) Applicant: Aquantia Corporation, San Jose, CA (US)

(72) Inventors: Ramin Farjadrad, Los Altos, CA (US); Seid Alireza Razavi majomard, San Carlos, CA (US)

(73) Assignee: Aquantia Corp., Milpitas, CA (US)

( * ) Notice: Subject to any disclaimer, the term of this patent is extended or adjusted under 35 U.S.C. 154(b) by 78 days.

(21) Appl. No.: 15/011,384

(22) Filed: Jan. 29, 2016

Related U.S. Application Data

(60) Provisional application No. 62/109,569, filed on Jan. 29, 2015.

(51) Int. Cl.
*H04B 1/04* (2006.01)
*H04L 12/927* (2013.01)
*H04L 12/26* (2006.01)

(52) U.S. Cl.
CPC ........... *H04B 1/0458* (2013.01); *H04L 43/50* (2013.01); *H04L 47/805* (2013.01); *H04B 2001/0416* (2013.01)

(58) Field of Classification Search
CPC ... H04L 56/1069; H04L 65/80; H04L 1/0002; H04L 1/0003; H04L 1/0032; H04L 1/1671; H04L 1/1685; H04L 27/12; H04L 27/14; H04L 27/156; H04L 29/06; H04L 29/12009; H04L 45/00; H04L 1/0009; H04L 27/2608; H04L 27/2272; H04L 1/16; H04L 27/2626
See application file for complete search history.

(56) References Cited

U.S. PATENT DOCUMENTS

| | | | |
|---|---|---|---|
| 5,680,400 | A | 10/1997 | York |
| 6,052,385 | A | 4/2000 | Kanerva |
| 6,081,523 | A | 6/2000 | Merchant et al. |
| 6,121,890 | A | 8/2000 | Rao |
| 6,195,360 | B1 | 2/2001 | Raza et al. |
| 6,377,640 | B2 | 4/2002 | Trans |

(Continued)

FOREIGN PATENT DOCUMENTS

WO    WO 2000/021204    4/2000

OTHER PUBLICATIONS

Ken Christense et al., IEEE 802.3az the Road to Energy Efficient Ethernet, IEEE Communications Magazine, Nov. 2010, 7 Pages.

(Continued)

*Primary Examiner* — Benjamin H Elliott, IV
(74) *Attorney, Agent, or Firm* — Lance Kreisman; Peninsula Patent Group

(57) ABSTRACT

A method for determining a power back-off value for an Ethernet channel is disclosed. The method includes measuring a signal-to-noise ratio (SNR) for each of the channels with a receiver corresponding to each channel. A transmit power level for a link partner transmitter is determined, where the transmit power level represents a minimum power level at the link partner transmitter that results in the measured SNR value at the receiver satisfying a predetermined SNR threshold. The transmit power level is communicated to the link partner transmitter and Ethernet data is then transceived between the link partners based on the determined transmit power level.

10 Claims, 4 Drawing Sheets

(56) References Cited

U.S. PATENT DOCUMENTS

| | | |
|---|---|---|
| 6,467,092 B1 | 10/2002 | Geile et al. |
| 6,532,277 B2 | 3/2003 | Ulanskas et al. |
| 6,922,448 B1 | 7/2005 | Jacobsen et al. |
| 7,027,407 B2 | 4/2006 | Diepstraten et al. |
| 7,106,833 B2 | 9/2006 | Kerpez |
| 7,113,491 B2 | 9/2006 | Graziano et al. |
| 7,158,563 B2 | 1/2007 | Ginis et al. |
| 7,324,511 B2 | 1/2008 | Nishihara |
| 7,353,007 B2 | 4/2008 | Carballo et al. |
| 7,525,992 B1 | 4/2009 | Shachal |
| 7,567,620 B2 | 7/2009 | Rozental |
| 7,593,431 B1 | 9/2009 | Lo et al. |
| 7,646,699 B2 | 1/2010 | Tellado et al. |
| 7,664,254 B2 | 2/2010 | Bostoen et al. |
| 7,693,240 B2 | 4/2010 | Mezer |
| 7,697,408 B2 | 4/2010 | Schneider et al. |
| 7,720,075 B2 | 5/2010 | Costo |
| 7,738,482 B2 | 6/2010 | Thousand et al. |
| 7,782,852 B2 | 8/2010 | Tellado et al. |
| 7,860,020 B2 | 12/2010 | Taich et al. |
| 7,936,778 B2 | 5/2011 | Ungerboeck et al. |
| 8,112,646 B2 | 2/2012 | Tsai |
| 8,196,016 B1 | 6/2012 | Langner et al. |
| 8,201,005 B2 | 6/2012 | Wertheimer et al. |
| 8,276,013 B2 | 9/2012 | Diab et al. |
| 8,320,411 B1 * | 11/2012 | Sedarat ............... H04W 52/365 370/241 |
| 8,520,562 B2 | 8/2013 | Taich et al. |
| 8,804,582 B1 | 8/2014 | Taich et al. |
| 8,804,798 B2 | 8/2014 | Malkin et al. |
| 9,001,872 B1 * | 4/2015 | Farjadrad ............... H04L 49/351 375/211 |
| 2002/0006167 A1 | 1/2002 | McFarland |
| 2002/0119783 A1 | 8/2002 | Bourlas et al. |
| 2003/0040298 A1 | 2/2003 | Heatley |
| 2004/0114503 A1 | 6/2004 | Schneider et al. |
| 2004/0184810 A1 | 9/2004 | Spilman et al. |
| 2005/0030808 A1 | 2/2005 | Brown et al. |
| 2005/0055467 A1 | 3/2005 | Campana et al. |
| 2005/0058152 A1 | 3/2005 | Oksanen et al. |
| 2005/0152466 A1 | 7/2005 | Maltsev et al. |
| 2005/0245216 A1 | 11/2005 | Boos |
| 2005/0259685 A1 | 11/2005 | Chang et al. |
| 2006/0109784 A1 | 5/2006 | Weller et al. |
| 2006/0153106 A1 | 7/2006 | Laakso et al. |
| 2006/0153307 A1 | 7/2006 | Brown et al. |
| 2006/0215561 A1 | 9/2006 | Wang et al. |
| 2007/0076722 A1 | 4/2007 | Ungerboeck et al. |
| 2007/0140289 A1 | 6/2007 | Tellado et al. |
| 2007/0162818 A1 | 7/2007 | Shen et al. |
| 2007/0192505 A1 | 8/2007 | Dalmia |
| 2007/0248024 A1 | 10/2007 | Conway et al. |
| 2008/0187028 A1 | 8/2008 | Lida |
| 2008/0294919 A1 | 11/2008 | Lida et al. |
| 2009/0080459 A1 | 3/2009 | Barkan et al. |
| 2009/0150745 A1 | 6/2009 | Langner et al. |
| 2009/0282277 A1 | 11/2009 | Sedarat et al. |
| 2010/0075704 A1 | 3/2010 | McHenry et al. |
| 2010/0115295 A1 | 5/2010 | Diab |
| 2010/0188980 A1 | 7/2010 | Desai et al. |
| 2011/0051620 A1 * | 3/2011 | Taich ...................... H04L 12/10 370/252 |
| 2011/0249686 A1 * | 10/2011 | Langner ................ H04L 1/0002 370/465 |
| 2012/0063295 A1 | 3/2012 | Bliss |
| 2012/0106345 A1 | 5/2012 | Diab |
| 2012/0170591 A1 | 7/2012 | Diab et al. |
| 2012/0188894 A1 | 7/2012 | Huschke et al. |
| 2013/0070823 A1 | 3/2013 | Malkin et al. |

OTHER PUBLICATIONS

Hugh Barrass, EEE Exchange of Management Information, IEEE 802.3az EEE Task Force, Mar. 2009, Vancouver, British Columbia, 11 Pages.

Zimmerman et al., IEEE Power Backoff, Solarflare,Teranetics, Feb. 19, 2005, 12 pages.

Zimmerman et al., IEEE Power Backoff, Mar. 15, 2005, 16 pages.

* cited by examiner

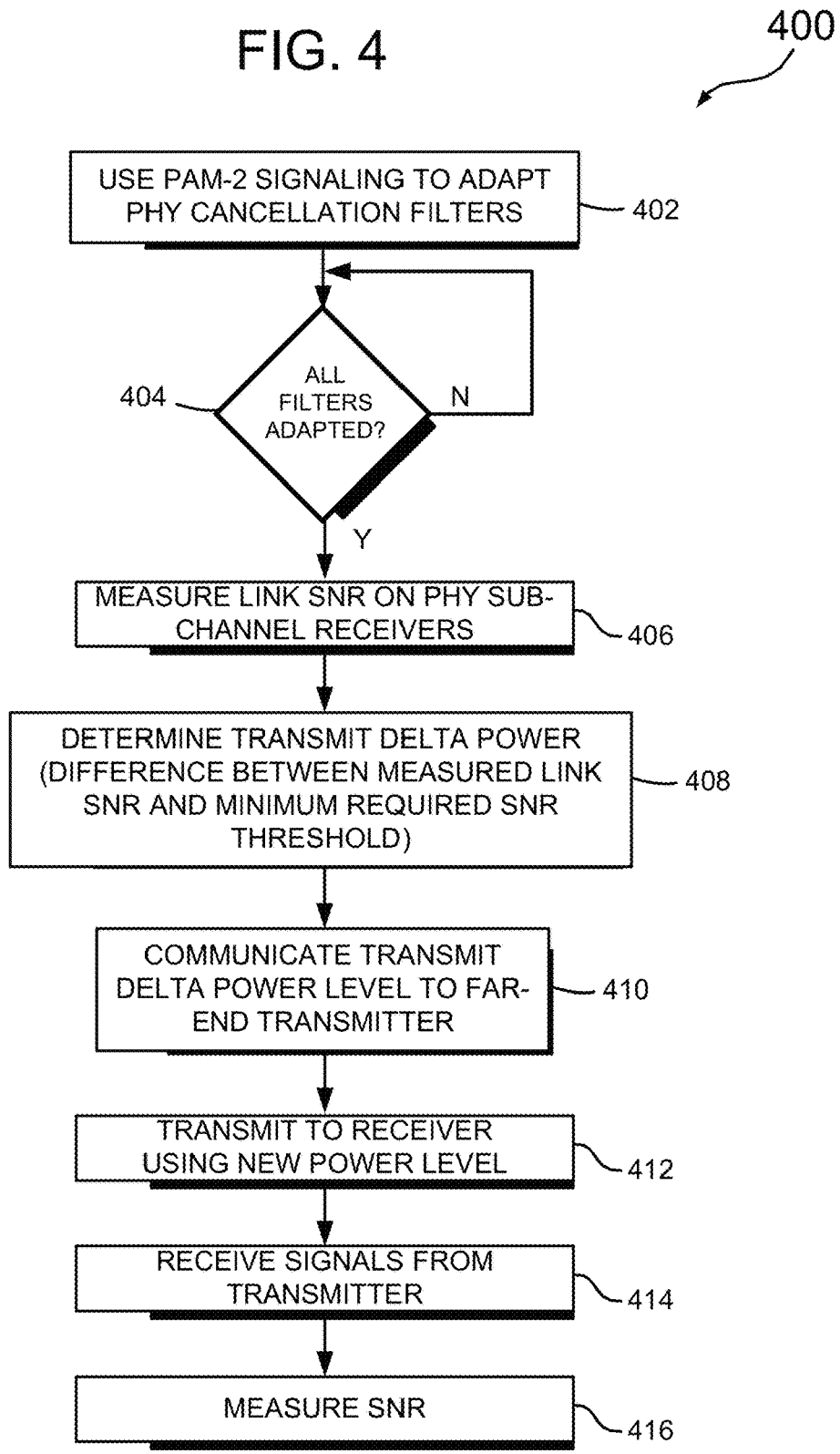

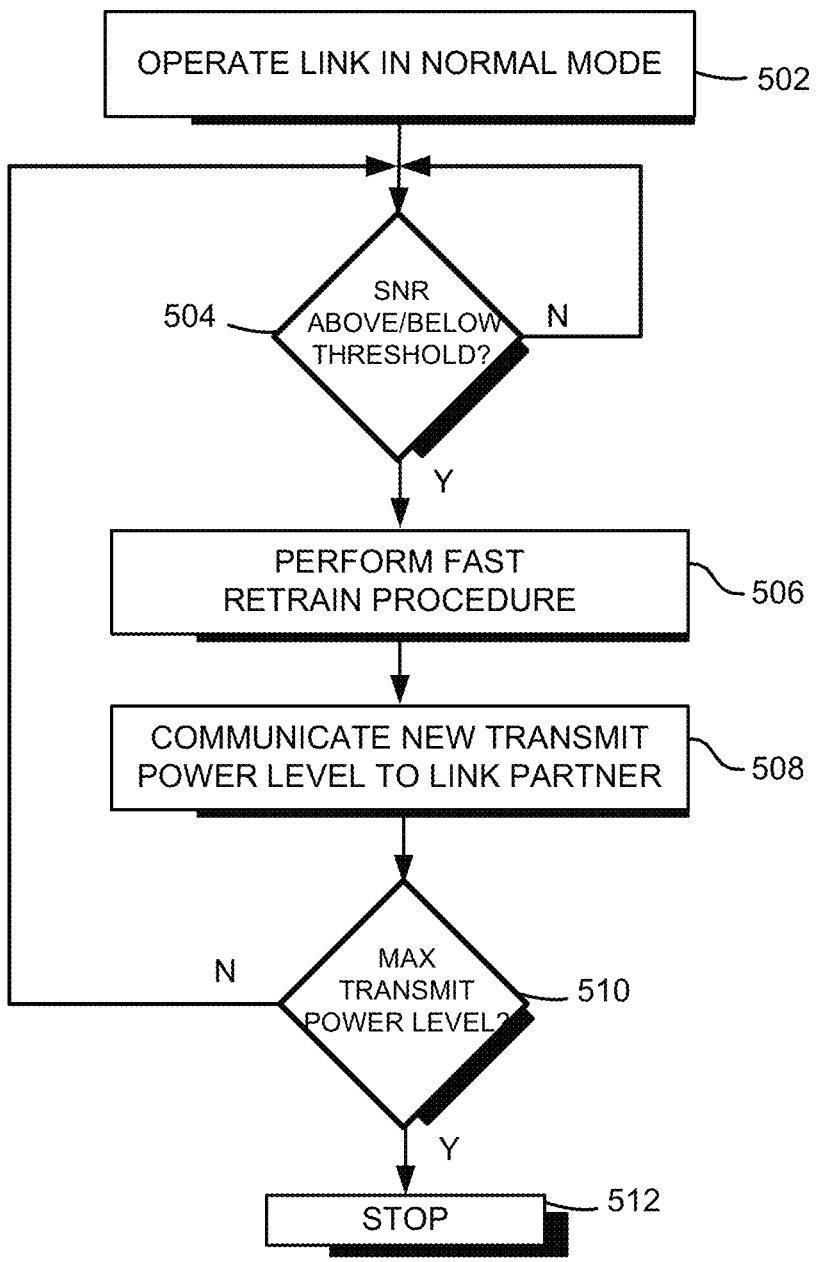

INTELLIGENT POWER BALANCING FOR NBASE-T ETHERNET

CROSS-REFERENCE TO RELATED APPLICATIONS

This application is a Non-Provisional that claims priority to U.S. Provisional Application No. 62/109,569, filed Jan. 29, 2015, entitled "Intelligent Power Balancing For NBASE-T Ethernet", which is incorporated herein by reference in its entirety.

TECHNICAL FIELD

The disclosure herein relates to communications systems, and more specifically to high-speed Ethernet systems and methods.

BACKGROUND

Much of today's modern Ethernet infrastructure is based on twisted pair copper cables that meet certain specifications. One common "category" of Ethernet cable is identified as CAT5e, which is rated for data rates up to 1 Gbps. Recently, however, proposals have been made to use the existing Ethernet infrastructure in the enterprise environment for data rates above 1 Gbps and up to 5 Gbps and beyond. Using cabling such as CAT5e and CAT6 at higher rates poses challenges such as alien crosstalk. Such cabling is typically designed for frequency ranges up to 100 MHz, yet increased data rates for new NBASE-T proposals often involve frequency ranges as high as 200 MHz and higher.

Certain NBASE-T proposals enable 5 Gbps over four twisted pairs in a bi-directional fashion, such that each pair transfers 1.25 Gbps at 400 MS/s in each direction. The signal Nyquist frequency is thus 200 MHz. A 5 Gbps NBASE-T transceiver physical layer circuit (PHY) can often deliver a reach of at least 100 m over CAT5e/CAT6 cables, where there are no aggressors. However, this reach may be limited to approximately 50 m over CAT5e and approximately 80 m over CAT6 in a "6-around-1" cabling configuration. Such a configuration arranges six cables (each having four twisted pair cables) in a radial relationship surrounding a centrally disposed cable (also having four twisted pair cables). Thus, the problem is clearly the level of alien crosstalk from adjacent cables that can significantly affect the link signal-to-noise ratio (SNR), especially when the link is long and signal attenuation is high.

In any communication link to achieve a target BER (bit error rate) at a given data rate, the signal SNR should be above a certain threshold and therefore the level of noise and interference should be contained. There may also be significant crosstalk from the other unshielded twisted pair (UTP) wires within the same cable; however, the information on the signals transmitted on each of these UTPs are generally known in the PHY and can be cancelled by linear filters.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 4 illustrates a flowchart of steps for one embodiment of a method for performing an intelligent power balancing method for a link.

FIG. 5 illustrates a flowchart similar to that of FIG. 4.

DETAILED DESCRIPTION

Figure 1:
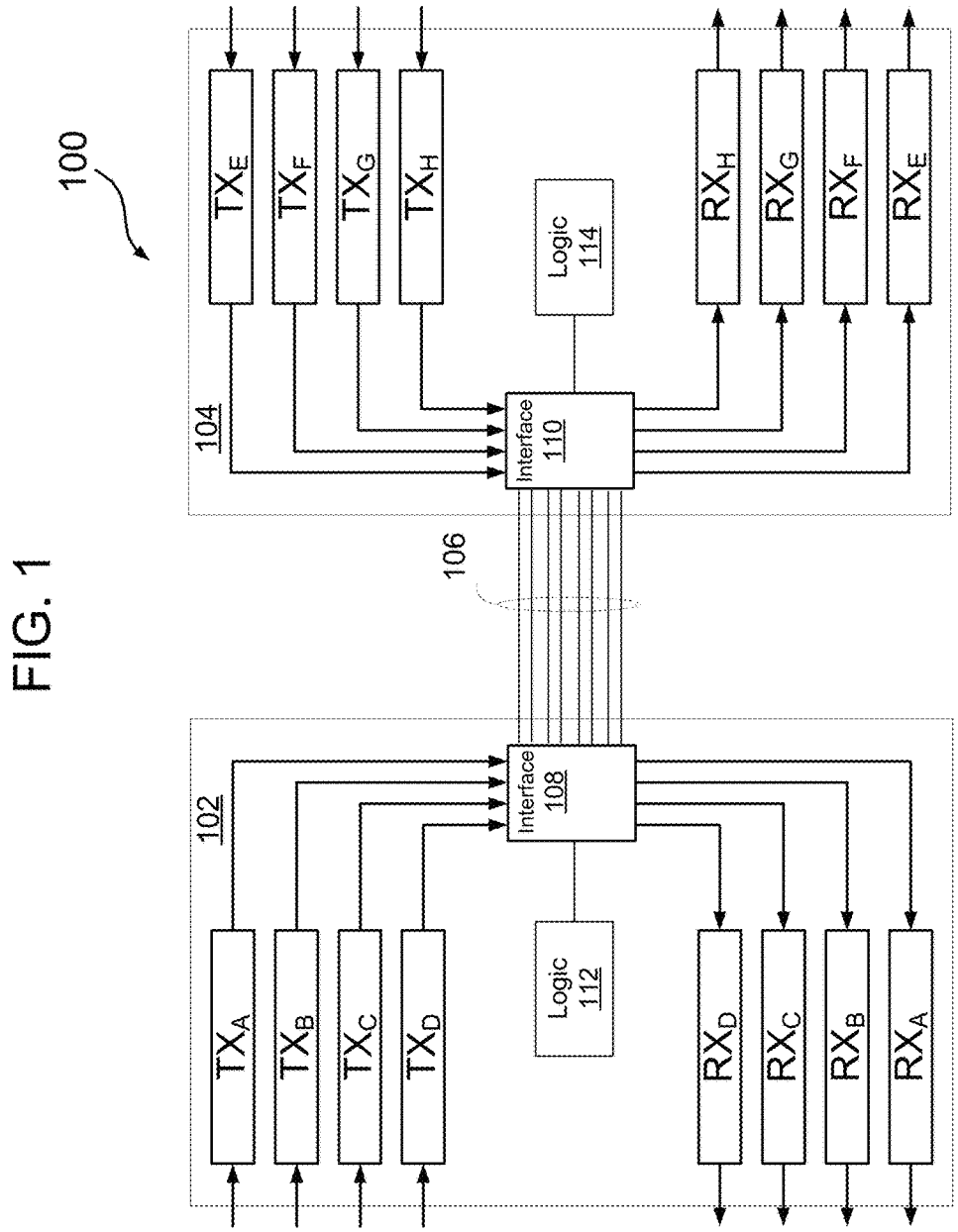
FIG. 1 illustrates a high-level transmitter/receiver (transceiver) channel architecture for an NBASE-T Ethernet transceiver.

FIG. 1 is a block diagram illustrating one embodiment of a communication system 100. The system includes a first transceiver integrated circuit (IC) or chip 102 and a second transceiver chip 104 that can communicate with each other. The first transceiver 102 includes "transceiver components" including one or more transmitters $TX_A$-$TX_D$ and one or more receivers $RX_A$-$RX_D$. Similarly, the second transceiver 104 includes various transceiver components including one or more transmitters $TX_E$-$TX_H$ and one or more receivers $RX_E$-$RX_H$. The transmitters $TX_A$-$TX_H$ shown in FIG. 1 can be considered individual "transmitters," as typically referenced herein, or can be considered individual transmitter channels which a transmitter block within the transceiver can independently transmit signals on. Similarly, receivers $RX_A$-$RX_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver which wants to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver chip 102 can communicate with the second transceiver chip 104 over one or more communication channels of a communication link 106. In one embodiment, such as one similar to the 10GBASE-T Ethernet standard, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners."

An interface 108 can be provided in the first transceiver chip 102 and an interface 110 can be provided in the second transceiver chip 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX). Logic 112 and 114 couples to the respective interfaces 108 and 110 for each transceiver 102 and 104, and is operable to measure a value indicative of the signal-to-noise ratio (SNR) of signals received from the communication link 106.

In one example, from the point of view of the first transceiver chip 102, data transmissions during a normal or regular operation mode from a local transmitter TX are provided to the interface 108, which outputs the data on a corresponding channel of the communication link 106. The data is received by the link partner, the second transceiver chip 104. The interface 110 of the transceiver 104 provides the received data to its receiver RX connected to that same channel. Furthermore, due to noise effects such as near-end crosstalk and echo, the data transmitted by the transmitters is also received by the near-end receivers in the same transceiver. Echo and crosstalk filters may be used to filter out this noise so that the receivers receive only data from other transceivers. In virtually all real scenarios, the data transmitted by a local transmitter has no dependence or relation with data being received by the corresponding local receiver.

Figure 2:
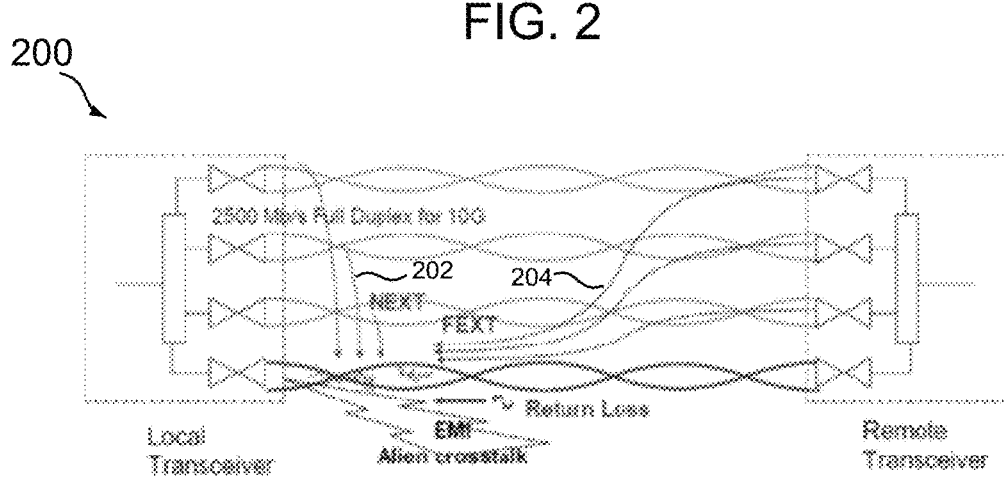
FIG. 2 illustrates one embodiment of an NBASE-T link that is exposed to near-end crosstalk (NEXT) and far-end crosstalk (FEXT).
Figure 3:
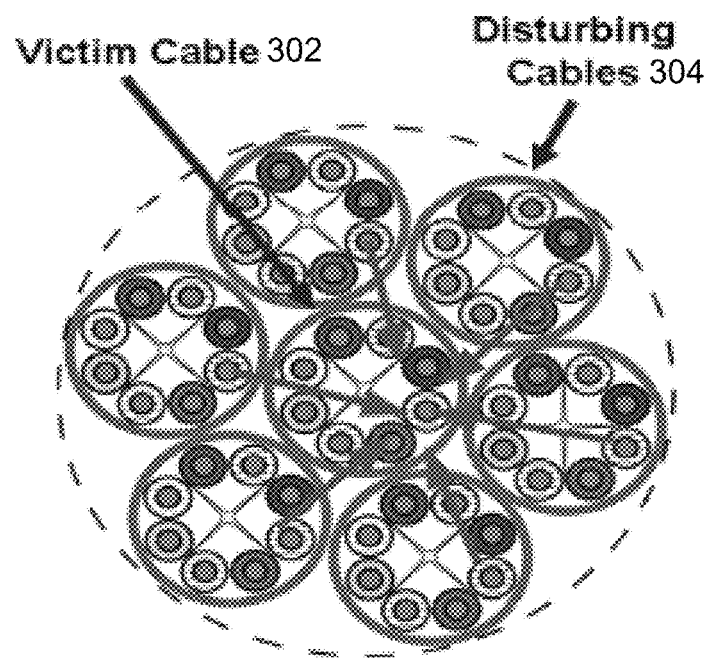
FIG. 3 illustrates one embodiment of a "6-around-1" unshielded twisted pair (UTP) cable cross-section with a center victim cable and 6 surrounding aggressor cables.

Referring now to FIG. 2, an example of an NBASE-T link is shown, generally designated 200, where the link itself is exposed to self-crosstalk involving near-end crosstalk (NEXT), such as at 202, and far-end crosstalk (FEXT), such as at 204. Generally, the NEXT and FEXT may be cancelled using canceller filters employed by the transceiver circuitry. However, alien crosstalk is generally not cancelled as the alien crosstalk data source are not usually available to the target transceiver FIG. 3 shows one embodiment of a "6-around-1" cable cross-section, where a center ("victim") cable 302 (having four twisted-pair cables) is exposed to the highest degree of alien crosstalk noise from six surrounding aggressor ("disturbing") cables 304. Each aggressor cable 304 is exposed to crosstalk from only three other cables (the center cable 302 and two other adjacent aggressor cables 304). In other words, not all of the cables are exposed to the same degree of alien crosstalk from other cables.

This observation may be used during link training to selectively improve the SNR only in links suffering from higher alien crosstalk. By doing so, an optimum data rate with efficient link power transmission levels may be efficiently achieved in most practical scenarios.

Referring now to FIG. 4, one embodiment of a method for intelligent power balancing, generally designated 400, provides an efficient way to determine power back-off (PBO) values to achieve enhanced SNR to cables experiencing higher degrees of alien interference. The method described below may be straightforwardly extended to a wide range of communication links experiencing mutual interference. However, for purposes of clarity, focus is addressed on one particular embodiment for multi-Gbps BASE-T signaling over UTP cables of the type such as CAT5e or CAT6. As briefly explained above, in a BASE-T scheme, the communication is over four twisted pairs in both directions. The signaling employed is typically pulse amplitude modulation (PAM-N) signaling, where each multi-level symbol carries more than 1 bit of information.

As defined in the 10GBASE-T standard, a transmit power level is defined based on a cable insertion loss using a pre-defined power-back-off (PBO) table. The purpose for this PBO solution is to reduce the amount of alien crosstalk among the various cables by transmitting a minimum amount of power required to meet the link SNR threshold per channel. This solution specifically helps improve the SNR in the longest link (or maximum insertion loss) of a cable configuration by reducing the amount of alien crosstalk from the shorter links with lower insertion loss and thus with better SNR margin. A similar PBO method was not employed in earlier BASE-T generations that transmit at lower speeds (1000BASE-T, 100BASE-T, 10BASE-T) as the SNR margin at those data rates was acceptable such that alien crosstalk was not an SNR limiting factor. Thus, in the lower-speed previous NBASE-T generations, the PHY generally transmitted at max power independent of cable length and insertion loss.

The PBO table in 10GBASE-T was designed solely based on a measured insertion loss of the cable, such that the insertion loss is used to estimate the cable length, and the worst case alien crosstalk at the PHY receiver then calculated based on the cable length, assuming a "6-around-1" configuration for aggressors. Therefore, the PBO was selected by calculating the link partner transmit power that yielded the SNR required at the PHY receiver according to the measured insertion loss, and worst case possible alien crosstalk noise. This straightforward PBO method is a reasonable solution for 10GBASE-T that is defined to dominantly run over CAT6A cables, as that category of cables are fairly resilient to alien crosstalk and the dominant source of SNR degradation is the inter-symbol interference (ISI) caused by frequency-dependent insertion loss.

With the introduction of new rates in the BASE-T standard (NBASE-T or IEEE802.3BZ) having a goal to run data rates between 1 Gbps-10 Gbps (specifically 2.5 Gbps and 5 Gbps) over legacy CAT5e or CAT6 cables, alien crosstalk has turned out to be a dominant source of SNR degradation at these rates. As a result, a PBO mechanism that is only based on insertion loss measurements, but using a worst case alien crosstalk value may not lead to an optimum overall solution for a given cable configuration.

The method described herein addresses the above inefficiencies of conventional 10GBASE-T PBO methods for data rates above 1 Gbps over CAT5e and CAT6 cables, where link SNR is very sensitive to alien crosstalk. The following method proposes a new intelligent PBO selection scheme that ensures that every link achieves the minimum required SNR for error free operation based on an actual cable insertion loss as well as an effective alien crosstalk noise power at the PHY receiver.

Further referring to FIG. 4, PBO values are typically determined during a link training procedure to train the parameters of the link, such as setting proper THP coefficients, obtaining filter convergence, and setting proper PBO levels.

Further referring to FIG. 4, in one embodiment, the link training phase uses PAM2 signaling, at 402, to adapt PHY cancellation filters in the current channel. The cancellation filters generally include equalizers such as a decision feedback equalizer (DFE) and a feed-forward equalizer (FFE) to cancel inter-symbol interference (ISI), echo filters to cancel reflections on the same channel, and crosstalk filters to cancel the near-end (NEXT) and far-end (FEXT) crosstalk from adjacent channels within the same PHY. PAM2 signaling (as opposed to higher levels of PAM modulation) may be used in the training sequence to maximize the signal SNR for faster and accurate convergence of the filters.

With continued reference to FIG. 4, a determination is made, at 404, as to whether all of the filters for the particular channel have adapted. If not, then the adaptation continues. If so, then the link SNR is measured on four PHY subchannel receivers, at 406. This measured SNR of the PAM2 signal at the receiver end of the link includes all the signal degradations in the channel, such as insertion loss and alien crosstalk. The measured SNR is then used, at 408, to determine a transmit delta power level which represents the difference between the power used to generate the measured PAM2 SNR and the power used to generate the minimum required SNR threshold for error free operation. The determined transmit delta thus represents the output power that the far-end transmitter needs to provide. This determined transmit delta power level is communicated to the far-end transmitter, at 410, using for example, the same PBO mechanism as in 10GBASE-T, which is over the info-field exchange bytes before the data link is established.

In some embodiments, and further referring to FIG. 4, after the determined transmit delta power level is communicated to the link partner transmitter, the transmitter transmits signals to the receiver at the new power level, at 412. The receiver receives the signals, at 414, and measures the SNR, at 416, to confirm that the adjustment results in the minimum acceptable SNR for signals received by the receiver. Should the SNR measurement indicate a detected SNR that is too low, or too high, then the process may be repeated until an optimal value is found.

Referring now to FIG. 5, while the method described above with respect to FIG. 4 may be carried out during a link training mode of operation, where the link is in an offline state, for some embodiments, a similar method may be carried out with the link maintained in an normal operating mode, such that the link remains in an online state. In some situations, a change in training parameters may be accomplished without the link going offline for a full training sequence, but rather a fast-retrain sequence. One example of a fast retrain sequence is described in U.S. patent application Ser. No. 12/604,358, titled "Fast Retraining For Transceivers in Communication Systems", filed Oct. 22, 2009, assigned to the assignee of the disclosure herein and incorporated by reference herein in its entirety.

Further referring to FIG. 5, the link may be operating in a normal mode of operation, at 502, with the logic monitoring the SNR for Ethernet data signals received from a link partner transmitter, at 504. Should the detected SNR remain at an optimal level (within respective high and low thresholds), then no adjustments take place. However, should the detected SNR be lower than a minimally expected threshold, or higher than an acceptable value, then the fast-retrain procedure may be carried out, at 506, to calculate a new transmit delta power level value, and communicate the level value to the link partner transmitter, at 508. After the level is communicated, and the value employed by the link partner transmitter, then the logic determines whether or not a maximum allowable transmit power level has been reached, at 510. If not, the process repeats, with the logic monitoring the SNR for Ethernet data signals that are transmitted at the new power level, at 504. If the maximum transmit power level has been reached, then the process may stop, at 512.

There may be other considerations in selecting a final PBO to ensure reliable link performance over all system corner conditions. One such example is the case of interference from different RF sources such as walkie-talkie or mobile phones.

Based on extensive lab experiments performed on many practical CAT5e/CAT6 cable configuration, the proposed intelligent power balancing technique provides an effective SNR improvement of as much as 2 dB in a worst-case link (victim) in most practical CAT5e/CAT6 cable configurations ("6-around-1") for a 5 Gbps speed mode. This particular speed mode is of specific interest as its signal spectrum generally requires at least 200 MHz of bandwidth, while CAT5e and all enterprise cabling, in general, are characterized and guaranteed only up to 100 MHz. The additional SNR obtained though this method extends error-free operation over most enterprise cables with minimal impact due to high alien crosstalk.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of operation in an Ethernet integrated circuit (IC) chip having multiple channels, the method comprising:
   during an offline mode of operation,
      measuring a signal-to-noise ratio (SNR) for each of the channels with a receiver corresponding to each channel;
      determining a transmit power level for a link partner transmitter, the transmit power level representing a minimum power level at the link partner transmitter that results in the measured SNR value at the receiver satisfying a predetermined SNR threshold;
      communicating the transmit power level to the link partner transmitter; and
   during an on-line mode of operation,
      transceiving first Ethernet data based on the determined transmit power level; and
      updating the determined transmit power level by measuring a run-time SNR,
         determining an updated transmit power level based on the measured run-time SNR,
         communicating the updated transmit power level to the link partner transmitter, and
         transceiving second Ethernet data based on the updated transmit power level.

2. The method of claim 1, wherein the measuring, determining and communicating are carried out in accordance with a fast-retrain sequence during a normal operation mode with the link in the on-line mode of operation.

3. The method of claim 1, wherein the communicating is carried out via an Info-Field exchange protocol.

4. The method of claim 1, further comprising:
   receiving Ethernet data from a transmitter transmitting with a given transmit power level;
   measuring the SNR of the received Ethernet data; and
   monitoring whether the measured SNR exceeds a minimum SNR threshold level.

5. The method of claim 4, wherein the receiving, measuring and monitoring is carried out during the online mode of operation.

6. An Ethernet integrated circuit (IC) chip, the Ethernet IC chip comprising:
   interface circuitry for coupling to multiple channels;
   receiver circuitry to receive signals from multiple channels via the interface circuitry;
   logic coupled to the interface circuitry, the logic operable to, for each of the multiple channels
      during an offline mode of operation,
         measure a signal-to-noise ratio (SNR) value for signals received over a given one of the multiple channels,
         determine a transmit power level representing a minimum power level at the link partner transmitter that results in the measured SNR value at the receiver satisfying a predetermined SNR threshold; and
      during an online mode of operation,
         updating the determined transmit power level by measuring a run-time SNR,
            determining an updated transmit power level based on the measured run-time SNR, and
   transmitter circuitry to transmit the updated transmit power level to the link partner transmitter.

7. The Ethernet IC chip of claim 6, wherein the logic is operable to measure the SNR values and determine the transmit power levels during a fast-retrain sequence.

8. The Ethernet IC chip of claim 6, wherein the transmitter transmits the transmit power level value in accordance with an Info-Field exchange protocol.

9. The Ethernet IC chip of claim 6, wherein the receiver circuitry is operable to receive Ethernet data from the link partner transmitter, transmitting at the transmit power level, for each of the multiple channels, and wherein the logic is operable to measure the SNR of the received Ethernet data to monitor that the SNR exceeds a minimum SNR threshold level.

10. The Ethernet IC chip of claim 9, wherein the receiver circuitry receives the Ethernet data and the logic is operable to measure the SNR values with the link in the online mode of operation.

* * * * *